United States Patent
Chouzenoux et al.

(10) Patent No.: US 8,230,735 B2
(45) Date of Patent: Jul. 31, 2012

(54) METHOD OF DYNAMICALLY CORRECTING FLOW RATE MEASUREMENTS

(75) Inventors: Christian Chouzenoux, Saint Cloud (FR); Yann Dufour, Vanves (FR); Cecile Lionnet, Les Loges en Josas (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 137 days.

(21) Appl. No.: 12/911,878

(22) Filed: Oct. 26, 2010

(65) Prior Publication Data

US 2011/0100136 A1 May 5, 2011

(30) Foreign Application Priority Data

Oct. 29, 2009 (EP) .................................... 09174406

(51) Int. Cl.
  *G01F 3/14* (2006.01)
  *G01F 1/12* (2006.01)
  *G01F 1/44* (2006.01)
(52) U.S. Cl. .................. 73/249; 73/861.63; 702/100
(58) Field of Classification Search ............... 73/861.48, 73/861.63, 249, 1.34; 702/100, 85
  See application file for complete search history.

(56) References Cited

U.S. PATENT DOCUMENTS

| | | | |
|---|---|---|---|
| 5,563,353 A | 10/1996 | Ferri | |
| 5,963,883 A * | 10/1999 | Cunkelman et al. | 702/47 |
| 7,185,526 B2 * | 3/2007 | Mattar | 73/1.34 |
| 2007/0233412 A1 | 10/2007 | Gotoh et al. | |

FOREIGN PATENT DOCUMENTS

WO   0227277   4/2002

* cited by examiner

*Primary Examiner* — Jewel V Thompson
(74) *Attorney, Agent, or Firm* — Matthias Abrell

(57) ABSTRACT

A flow rate of a fluid flowing in a tubing is determined using a flow meter. The flow meter measures a value related to the flow rate. The tubing has a valve for controlling the fluid flowing through the flow meter. The method of determination of the flow rate includes closing the valve and measuring a first zero flow rate value at a first time and a second zero flow rate value at a second time, estimating an error of the value measurement based on the first and second zero flow rate values, opening the valve and measuring value of the flowing fluid, applying an error correction to the measured value of the flowing fluid, and calculating a corrected flow rate based on the corrected value of flowing fluid.

12 Claims, 5 Drawing Sheets

METHOD OF DYNAMICALLY CORRECTING FLOW RATE MEASUREMENTS

FIELD

An aspect of the disclosure relates to a method for determining a flow rate of a fluid flowing in a tubing using a flow meter, and in particular but not exclusively, by a Venturi type flow meter installed in a borehole of a hydrocarbon well.

BACKGROUND

During completion operations, the completion/production equipments like packers, production tubings, valves, various sensors or measuring apparatuses, etc . . . are installed downhole. Subsequently, production operations can begin. It is known to deploy permanent sensors for measuring various parameters related to the reservoir, the borehole, the fluid flowing into the borehole, etc. . . . These sensors are used to monitor the downhole reservoir zones and control the production of hydrocarbon.

An important measurement in the reservoir production monitoring and control is the flow rate. For example, the flow rate of the fluid mixture flowing in various tubings extending from the downhole reservoir zones towards the surface may be continuously monitored.

The flow rate may be measured by flow meter, like piston flow meter, multi-jet flow meter, Venturi flow meter, thermal mass flow meter, ultrasonic flow meter, etc . . . Typically, the flow meters do not strictly measure the flow rate, but derive an estimation of the flow rate based on the measurement of a characteristic parameter correlated to the flow rate, namely rotation number in a piston flow meter, velocity in multi-jet flow meter, pressure in Venturi flow meter, heat transfer in thermal mass flow meter, transit time in ultrasonic flow meter, etc . . .

The flow meter measurements, in particular Venturi flow meters, tend to drift with time. In order to get an accurate estimation of the flow rate, it is necessary to correct the effect of the drift on the characteristic parameter.

SUMMARY

It is an object of the disclosure to propose a method of determining a flow rate of a fluid flowing into a tubing or a flow meter that overcomes one or more of the limitations of the existing flow rate determination method or flow meter.

According to one aspect of the disclosure a method of determining a flow rate of a fluid flowing in a tubing using a flow meter, said flow meter measuring a value related to the flow rate, wherein the tubing having a valve for controlling the fluid flowing through the flow meter, is provided. The method includes closing the valve and measuring a first zero flow rate value at a first time and a second zero flow rate value at a second time, estimating an error of the value measurement based on the first and second zero flow rate values, opening the valve and measuring value of the flowing fluid, and applying an error correction to the measured value of the flowing fluid, and calculating a corrected flow rate based on the corrected value of flowing fluid.

According to another aspect of the disclosure, an instrumented tubing, is provided. The tubing includes a valve for controlling the fluid flowing through the flow meter, a flow meter for measuring a flow rate of a fluid flowing in the tubing, the measurement including a first zero flow rate value at a first time and a second zero flow rate value at a second time and for measuring a flowing value, and an electronic unit comprising a processor for estimating an error of the value measurement based on the first and second zero flow rate values, applying an error correction to the measured value of the flowing fluid, and calculating a corrected flow rate based on the corrected value of flowing fluid.

The method and instrumented tubing are reliable and cost effective. They may be used in permanent application while enabling a minimum impact on the well completion. In effect, its miniaturization renders the instrumented tubing suitable for placement in borehole, and its reliability enables long lifetime function according to determined specifications in harsh downhole environments (high pressure and/or temperature).

BRIEF DESCRIPTION OF THE DRAWINGS

The present disclosure is illustrated by way of example and not limited to the accompanying Figures, in which like references indicate similar elements.

DETAILED DESCRIPTION

Figure 1:
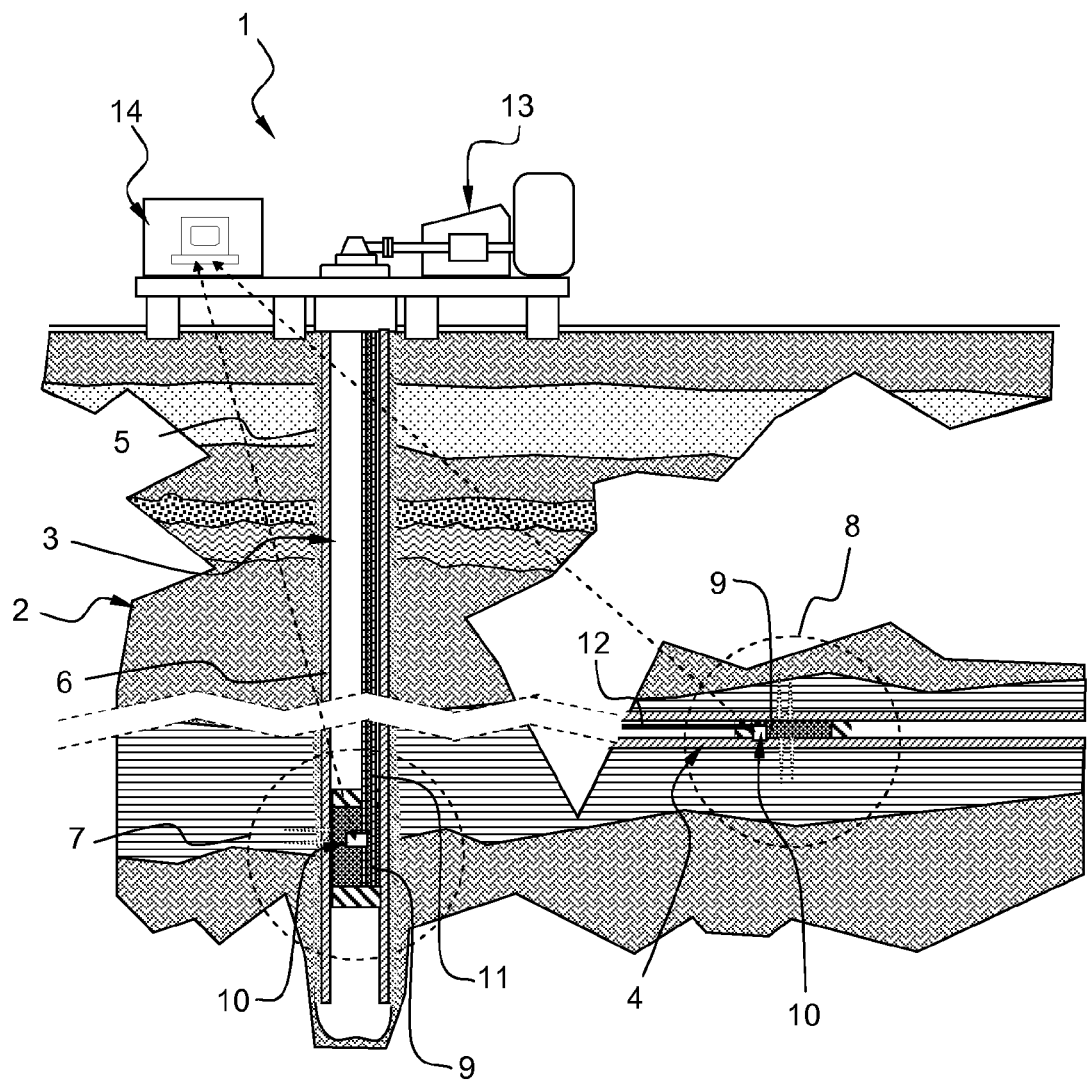
FIG. 1 schematically shows an onshore hydrocarbon well location illustrating examples of deployment of the instrumented tubing and flow meter of the disclosure.

FIG. 1 schematically shows an onshore hydrocarbon well location and equipments 1 above a hydrocarbon geological formation 2 after drilling operation has been carried out, after a drill pipe has been run, and after cementing, completion and perforation operations have been carried out. The well is beginning producing hydrocarbon, e.g. oil and/or gas. At this stage, the well bore comprises substantially vertical portion 3 and may also comprise horizontal or deviated portion 4. The well bore 3, 4 is either an uncased borehole, or a cased borehole comprising a casing 5 and an annulus 6, or a mix of uncased and cased portions.

The annulus 6 may be filled with cement or an open-hole completion material, for example gravel pack. Downhole, a first 7 and second 8 producing sections of the well typically comprises perforations, production packers and production tubing at a depth corresponding to a reservoir, namely hydrocarbon-bearing zones of the hydrocarbon geological formation 2. In one embodiment, one or more flow meters 10 for measuring the flow rate of the fluid mixture 9 flowing into the cased borehole, for example in the first 7 and second 8 producing sections of the well (as represented in FIG. 1) or other sections of the well (not represented in FIG. 1), may be installed in production tubings 11, 12 of the completion. In the present example, the fluid mixture is a hydrocarbon fluid mixture that may comprise oil, gas and/or water.

At the surface, the production tubings are coupled to appropriate surface production arrangement 13 typically comprising pumping arrangement, separator and tank, etc. Surface equipment 14 may comprise a computer forming a control and data acquisition unit coupled to the flow meter of the disclosure, and/or to other downhole sensor and/or to active completion device like valves. Surface equipment 14 may also comprise a satellite link (not shown) to transmit data to a client's office. Surface equipment 14 may be managed by an operator. The precise design of the down-hole producing section and surface production/control arrangement is not germane to the present disclosure, and thus is not described in detail hereinafter.

Figure 2:
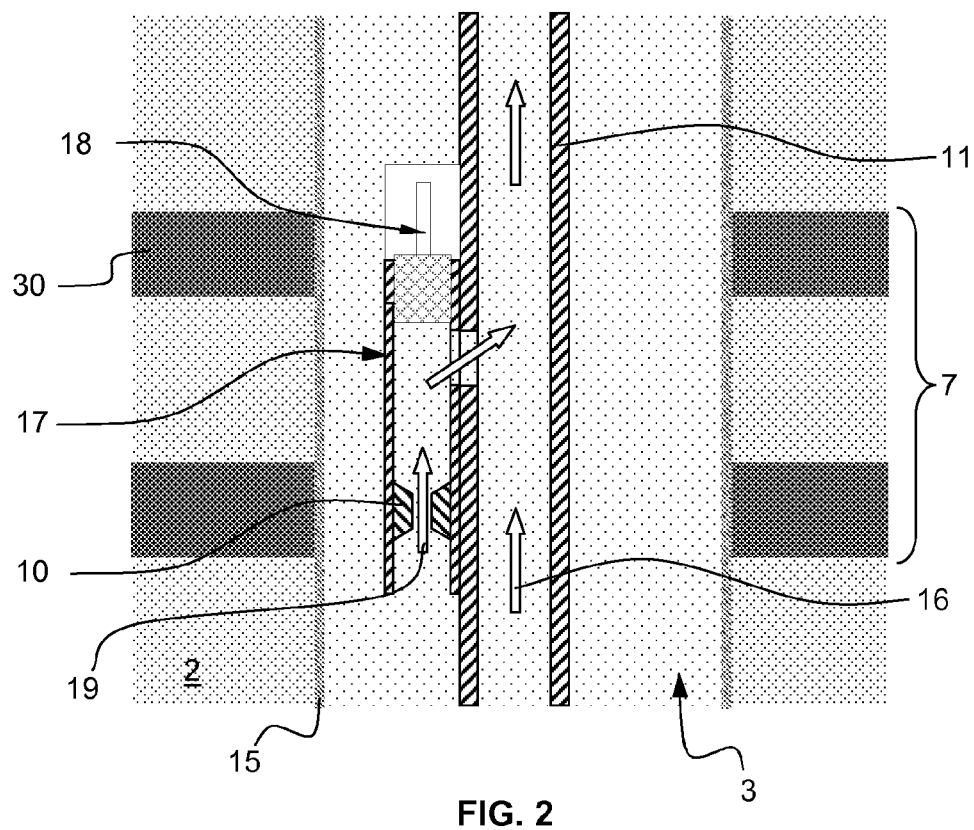
FIG. 2 is a front cross-section view in a geological formation schematically showing a flow meter in an instrumented tubing according to the disclosure in an uncased borehole.

FIG. 2 is a front cross-section view of a geological formation 2 schematically showing a flow meter 10. The producing hydrocarbon well 3 comprises an uncased borehole in a geological formation 2 comprising at least a layer of oil 30.

The well bore 3 is an uncased borehole that may be covered by a mudcake 15. Alternatively, the well bore should also be a cased borehole (not shown in FIG. 2) comprising a casing and an annulus. The annulus may be filled with cement or an open-hole completion material, for example gravel pack, or formation sand, or formation fluids. The well bore 3 further comprises a completion consisting of a production tubing 11. It may further comprise a packer and a series of perforations in a cased portion of the borehole (not shown). A produced hydrocarbon fluid mixture 16 flows towards the surface through the production tubing 11. In the production zone 7, an instrumented tubing 17 comprising the flow meter 10 is coupled to the production tubing 11. The hydrocarbon fluid mixture flowing from the production zone 7 flows into the production tubing 11 through the instrumented tubing 17. For example, both tubings are welded together. The instrumented tubing 17 may have a length ranging from a few dozen of centimeters to a meter, and a diameter of the order of a typical production tubing diameter. A first end of the instrumented tubing is opened, while the second end is closed. The instrumented tubing further comprises a lateral hole. For example, both tubings are coupled in a parallel manner and comprise a hole to communicate with each other. Thus, the fluid mixture flowing out of the producing zone 7 may flow into the production tubing 11 after having flown through the instrumented tubing 17. The instrumented tubing 17 is made of conductive material, for example stainless steel or other metal alloy capable of withstanding high pressure, high temperature and corrosive environments. The flow meter 10 is fitted within the instrumented tubing 17. Thus, the whole volume of fluid mixture 19 produced by the reservoir zone 7 flowing towards the production tubing 11 is measured by the flow meter 10.

The instrumented tubing 17 may further comprise various sensors measuring various parameters of the fluid, for example a water fraction sensor.

The instrumented tubing 17 further comprises a control valve 18 to choke the hydrocarbon fluid mixture production of the producing zone 7. When the control valve 18 is closed, the production of the specific producing zone 7 is interrupted. When the control valve 18 is opened the production of the specific producing zone 7 is resumed. Typically, the control valve 18 operates in response to specific commands received from the surface. It may also operate in response to specific commands sent by a local sensor, for example a water fraction sensor detecting the ratio of water or oil in the fluid mixture produced by the specific production zone.

Figure 3:
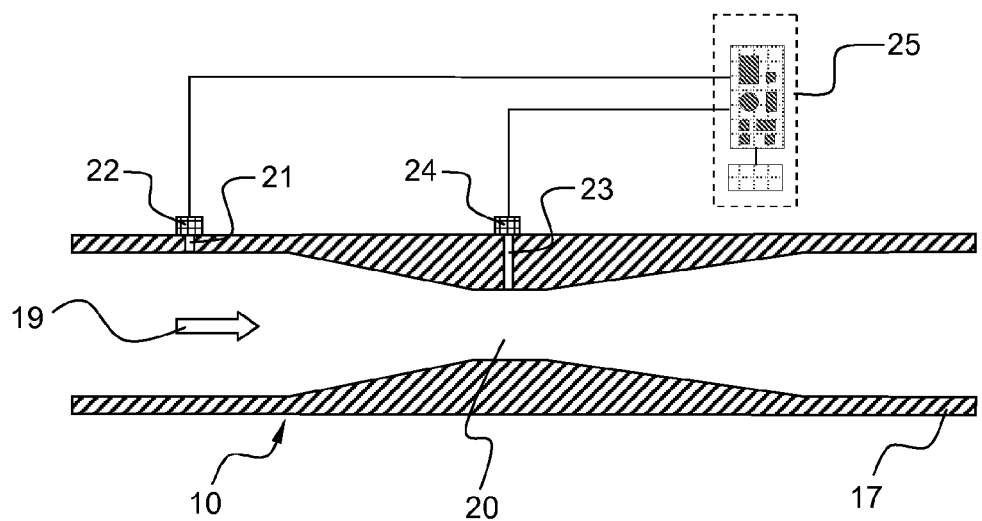
FIG. 3 is a partial front cross-section view schematically showing in details a Venturi flow meter according to the disclosure.

FIG. 3 is a partial front cross-section view in an instrumented tubing 17 schematically showing in details an example of flow meter, namely a Venturi flow meter. Typically, in a Venturi flow meter, the fluid flow is constricted and the differential pressure that results across the constriction is measured. The flow rate of fluid can be derived from the differential pressure measurement. The Venturi flow meter can be used to monitor the flow rate of the fluids entering the production tubing through the instrumented tubing controlled by the control valve 18. The Venturi flow meter 10 is positioned in the instrumented tubing 17 and comprises a constriction or throat 20, an upstream pressure tapping 21, a first pressure sensor 22, a throat pressure tapping 23 at the throat of the Venturi, a second pressure sensor 24 and an electronic unit 25.

It is to be emphasized that there is no differential pressure sensor available for downhole applications, namely exposure to downhole conditions over long period of time, appropriate degree of miniaturization. For this reason, the differential pressure is determined by means of the first and second pressure sensors 22, 24 which are separated absolute pressure sensors operating independently from each other. The pressure sensors may be quartz, sapphire or SOI (silicon on insulator) sensors. Such pressure sensors show lacks in the stability of the pressure measurements because they tend to drift in a relatively linear manner. The pressure measurements typically vary in the order of several dozen of millibars per year, which impacts the estimation of the flow rate and its accuracy. Thus, it is necessary to correct the effect of the drift on the pressure difference in order to get an accurate estimation of the flow rate.

The electronic unit 25 is coupled to the first 22 and second 24 sensors of the upstream 21 and throat 23 pressure tappings, respectively. The electronic unit 25 comprises typical components, like an A/D converter, a processor, a memory that will not be further described. The electronic unit 25 calculates an estimate of the flow rate based on the pressure measurements as explained hereinafter. The electronic unit 25 may also comprise a transmission module for transferring the measurements to the surface. The measurements may be transferred by wireless communication (acoustics or electromagnetic) or by wire between the transmission module and surface equipment 14 (shown in FIG. 1).

The pressure difference between the upstream pressure tapping and the throat pressure tapping (or "differential pressure") is related to the square of the velocities of the fluid across those sections.

Neglecting pressure losses due to viscosity, assuming that the fluid velocity is constant across the tubing section, and considering the case of an incompressible flow, the Bernoulli equation leads to:

$$Q = \frac{\pi d^2 C}{4} \frac{\sqrt{2\Delta P_Q}}{\sqrt{\rho(1-\beta^4)}} \tag{1}$$

where:
- Q is the volume flow rate (m³/s);
- d is the diameter of the throat section (m);
- C is the discharge coefficient (dimensionless);
- $\Delta P_Q$ is the differential pressure between upstream and throat pressure tappings (Pa);
- ρ is the fluid density (kg/m3); and
- β is the diameter ratio (dimensionless), namely the ratio between the diameter of the tubing and the throat section.

Figure 4:
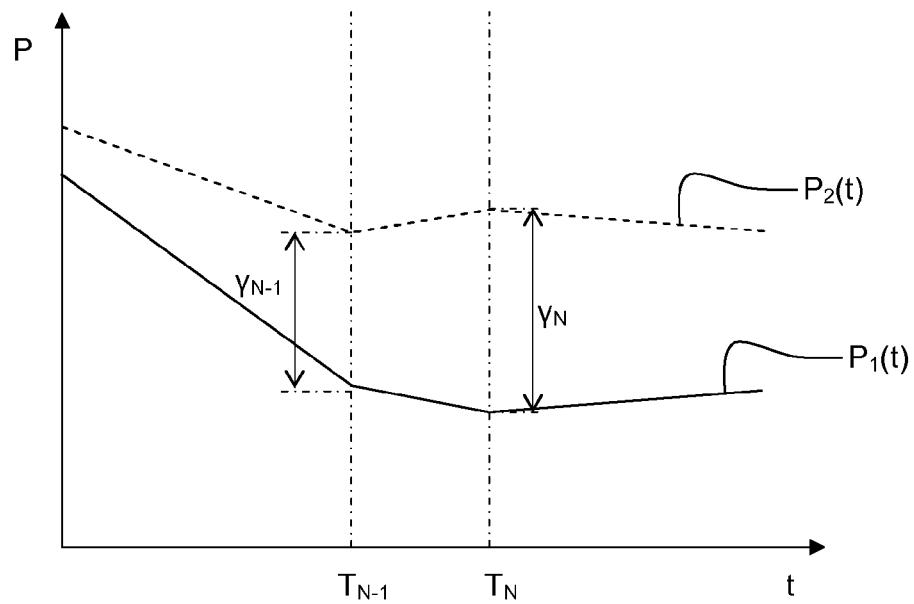
FIG. 4 schematically illustrates the linear drift of a Venturi flow meter.

FIG. 4 illustrates the stability test results of a group of absolute pressure sensors submitted to the same reference pressure, representative of the downhole conditions. The graphic represents the pressure P versus time t, and shows the evolution of the pressure measurements at the upstream pressure tapping $P_1$ (full line), and at the throat pressure tapping $P_2$ (broken line). Despite an initial calibration, there is an initial pressure offset. The pressure drift is approximately a linear function of time. However, the slope of the drift varies from one sensor to the other, and may also vary with time.

The pressure measurement $P_1(t)$ provided by the first sensor 22 measuring the pressure at the upstream pressure tapping 21 is:

$$P_1(t)=P_{res}(t)+\epsilon_1(t) \quad (2)$$

where:
$P_{res}(t)$ is the actual pressure as function of time, or the unknown value; and
$\epsilon_1(t)$ is the measurement error made by the first sensor 22.

Assuming that the error term comes from the pressure drift of sensor, and assuming this drift is linear, the measurement error made by the first sensor is:

$$\epsilon_1(t)=\alpha_1 t+\beta_1 \quad (3)$$

where $\alpha_1$ and $\beta_1$ are the constant coefficients of the linear drift of the first sensor 22.

The pressure measurement $P_2(t)$ provided by the second sensor 24 measuring the pressure at the throat pressure tapping 23 is:

$$P_2(t)=P_{res}(t)-\Delta P_Q(t)+\epsilon_2(t) \quad (4)$$

where:
$P_{res}(t)$ is the actual pressure as function of time, or the unknown value;
$\Delta P_Q(t)$ is the actual pressure loss due to the fluid acceleration when flowing through the Venturi restriction; and
$\epsilon_2(t)$ is the measurement error made by the second sensor 24.

Assuming that the error term comes from the pressure drift of sensor, and assuming this drift is linear, the measurement error made by the second sensor is:

$$\epsilon_2(t)=\alpha_2 t+\beta_2 \quad (5)$$

where $\alpha_2$ and $\beta_2$ are the constant coefficients of the linear drift of the second sensor 24.

The differential pressure can then be written as:

$$P_1(t)-P_2(t)=\Delta P_Q(t)+(\alpha_1-\alpha_2)t+\beta_1-\beta_2 \quad (6)$$

The differential drift $\delta$ is:

$$\delta=\alpha_1-\alpha_2 \quad (7)$$

The differential offset $\gamma$ is:

$$\gamma=\beta_1-\beta_2 \quad (8)$$

From equation 6, the differential pressure can then be written as:

$$P_1(t)-P_2(t)=\Delta P_Q(t)+\delta \cdot t+\gamma \quad (9)$$

According to the disclosure, the periodic control valve closing is used to determine the differential drift and offset of both pressure sensors of the Venturi flow meter. Then, a correction may be applied to the pressure measurements. This correction may be updated at each subsequent control valve closing.

The valve is closed at the time $t=T_{N-1}$, $t=T_N$, etc ... When the control valve is closed, the fluid is not flowing across the venturi flow meter. As a consequence, the actual differential pressure $\Delta P_Q$ is equal to zero. However, due to the pressure offset of each pressure sensor, the measured differential pressure $\gamma_{N-1}$ and $\gamma_N$ at time $T_{N-1}$ and $T_N$ respectively is not equal to zero:

$$\gamma_{N-1}=P_1(T_{N-1})-P_2(T_{N-1}) \quad (10)$$

$$\gamma_N=P_1(T_N)-P_2(T_N) \quad (11)$$

From equations (9), (10) and (11), the measured differential pressure $\gamma_N$ at $t=T_N$ is given by:

$$\gamma_N=\gamma_{N-1}+\delta_N \cdot (T_N-T_{N-1}) \quad (12)$$

The correction parameter $\delta_N$ can be obtained from:

$$\delta_N = \frac{\gamma_N - \gamma_{N-1}}{T_N - T_{N-1}} \quad (13)$$

Assuming that the drift of each pressure sensor is constant, namely that there isn't any abrupt change of the slope, the error $E_N(t)$ due to the respective drift and offset of each pressure sensor for the time interval $[T_N; T_{N+1}]$ can be extrapolated by:

$$E_N(t)=\delta_N(t-T_N)+\gamma_N \quad (14)$$

The drift-corrected estimation of flow rate $Q_C(t)$ at time $t>T$ (in m³/s) is given by:

$$Q_C(t) = \frac{\pi d^2 C}{4} \frac{\sqrt{2|\Delta P_Q(t) - E(t)|}}{\sqrt{\rho(1-\beta^4)}} \quad (15)$$

where:
d is the diameter of the throat section (m);
C is the discharge coefficient (dimensionless);
$\Delta P_Q(t)$ is the differential pressure between upstream and throat pressure tappings (Pa);
E(t) is the dynamic drift correction (Pa);
$\rho$ is the fluid density (kg/m3); and
$\beta$ is the diameter ratio (dimensionless).

Figure 5:
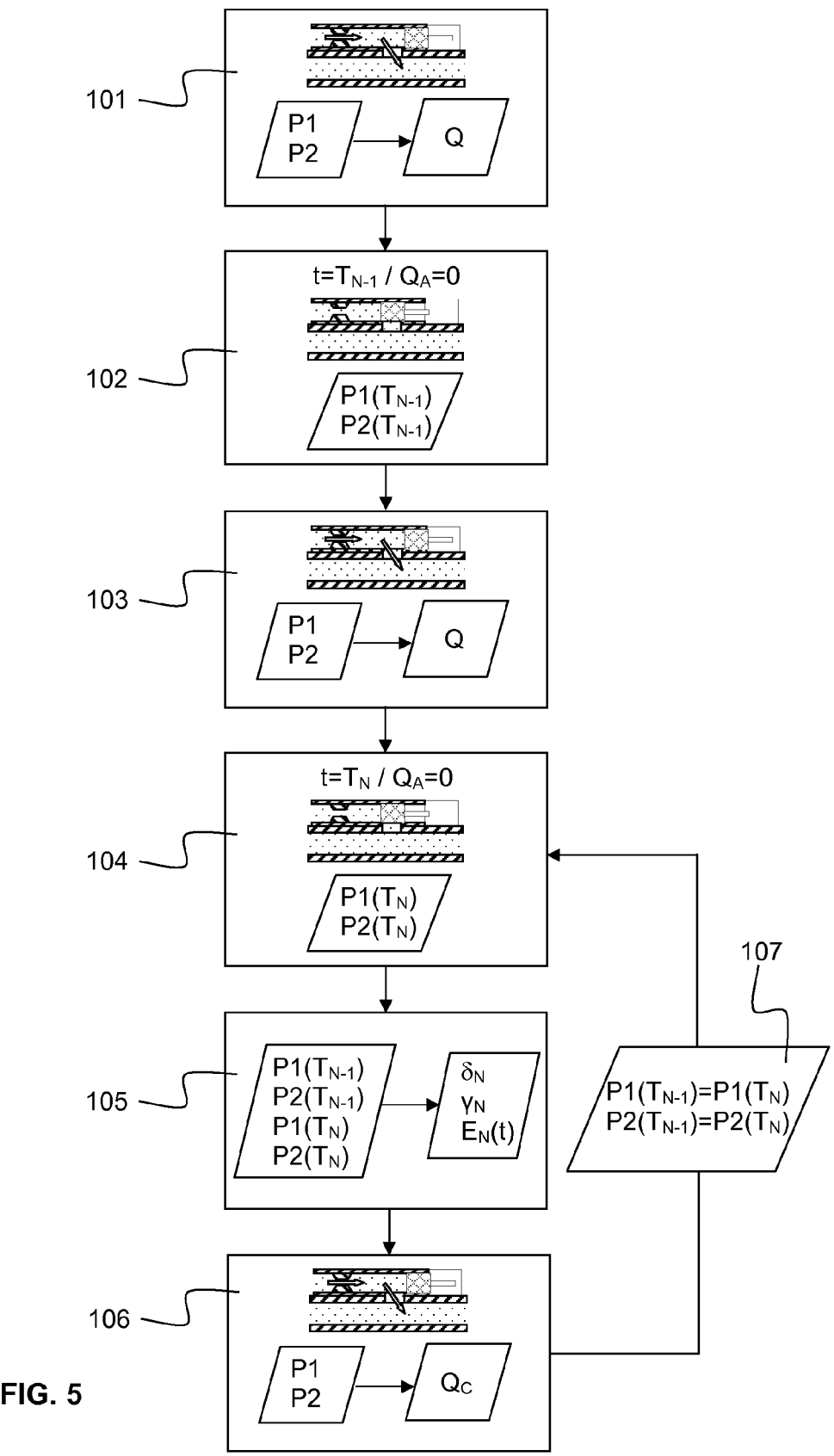
FIG. 5 schematically illustrates the method of correcting drift and offset according to the disclosure.

FIG. 5 schematically illustrates the method of correcting drift and offset of the flow rate Q determined by the flow meter 10.

Though not shown, prior to the deployment of the flow meter 10, the pressure sensors together with the electronic unit may be calibrated. Thus, the initial offset associated with the pressure measurements can be estimated.

In a first step 101, the valve 18 is in an open state, letting the fluid flowing through the flow meter 10. The fluid 19 flows from the production zone 7 through the instrumented tubing 17 and the flow meter 10 towards the production tubing 11. The values, namely the pressures at the upstream $P_1$ and throat $P_2$ pressure tappings can be measured. However, the flow rate Q that may be determined according to the hereinbefore mentioned Venturi equation may only be corrected for the initial offset.

In a second step 102, at a first time $T_{N-1}$ the valve 18 is in a closed state, shutting-off the fluid flowing through the flow meter 10. Thus, the actual flow rate is zero. A first pressure $P_1(T_{N-1})$ and a second pressure $P_2(T_{N-1})$ are measured and kept in memory. These pressure measurements correspond to the zero flow rate at the first time.

In a third step 103, the valve 18 is in an open state, letting the fluid flowing through the flow meter 10. The pressures at the upstream $P_1$ and throat $P_2$ pressure tappings can be measured. However, the flow rate Q that may be determined according to the hereinbefore mentioned Venturi equation may only be corrected for initial offset.

In a fourth step 104, at a second time $T_N$ the valve 18 is in a closed state, shutting-off the fluid flowing through the flow meter 10. Thus, the actual flow rate is zero. A first pressure $P_1(T_N)$ and a second pressure $P_2(T_N)$ are measured. These pressure measurements correspond to the zero flow rate at the second time.

In a fifth step 105, the error E combining the differential drift δ and the differential offset γ based on the first and second zero flow rate pressure measurements $P_1(T_{N-1})$, $P_2(T_{N-1})$, $P_1(T_N)$ and $P_2(T_N)$ can be estimated according to the hereinbefore mentioned equations (12), (13) and (14).

In a sixth step 106, the valve 18 is in an open state, letting the fluid flowing through the flow meter 10. The pressures at the upstream $P_1$ and throat $P_2$ pressure tappings can be measured. The error correction can be applied to the measured pressures of the flowing fluid. A corrected flow rate $Q_C$ is calculated based on the corrected measured pressures according to the hereinbefore mentioned equation (15).

The flow rate can be monitored in a continuous manner till the next error evaluation. For example, periodically, namely after a defined time interval has elapsed, or upon command from the surface a new error value may be estimated. In a seventh step, the last measured zero flow rate pressure values are attributed to the former first zero flow rate pressure measurements $P(T_{N-1})$, and a new valve closing according to the fourth step 104, a new error determination according to the fifth step 105 are performed.

Figure 6:
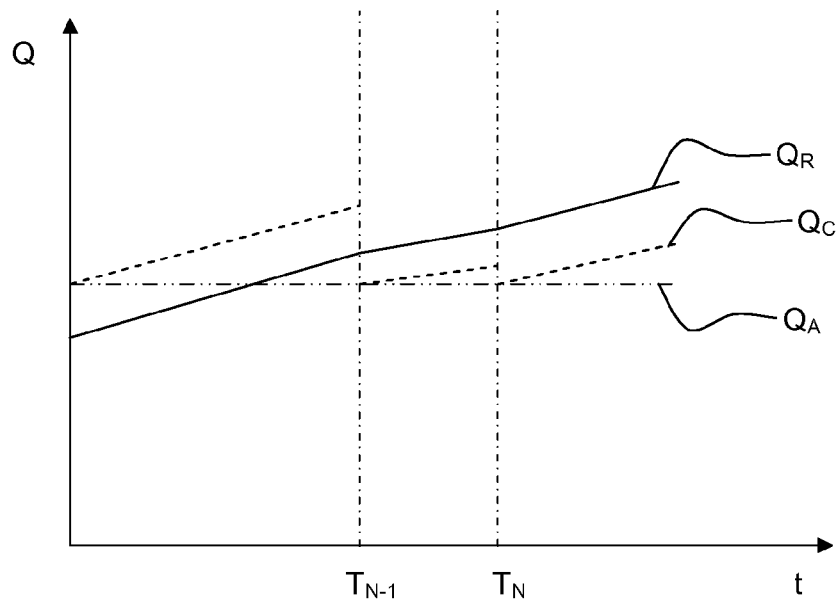
FIG. 6 schematically illustrates the effect of dynamic drift and offset correction on the measurements of a Venturi flow meter.

FIG. 6 illustrates the effect of dynamic drift correction on the estimation of the flow rate Q. The graphic represents the flow rate Q versus time t, and shows the actual flow rate $Q_A$ (dash-dotted line), the raw flow rate $Q_R$ (full line) based on raw pressure measurement and the corrected estimated flow rate $Q_C$ (broken line) using the hereinbefore described correction method.

During the first period of time, the flow rate estimation only takes into account the initial pressure offset. During the subsequent period of time, the flow rate estimation $Q_C$ takes into account the dynamic drift correction. The dynamic drift correction enables a significant improvement of the accuracy in estimating the flow rate.

Figure 7:
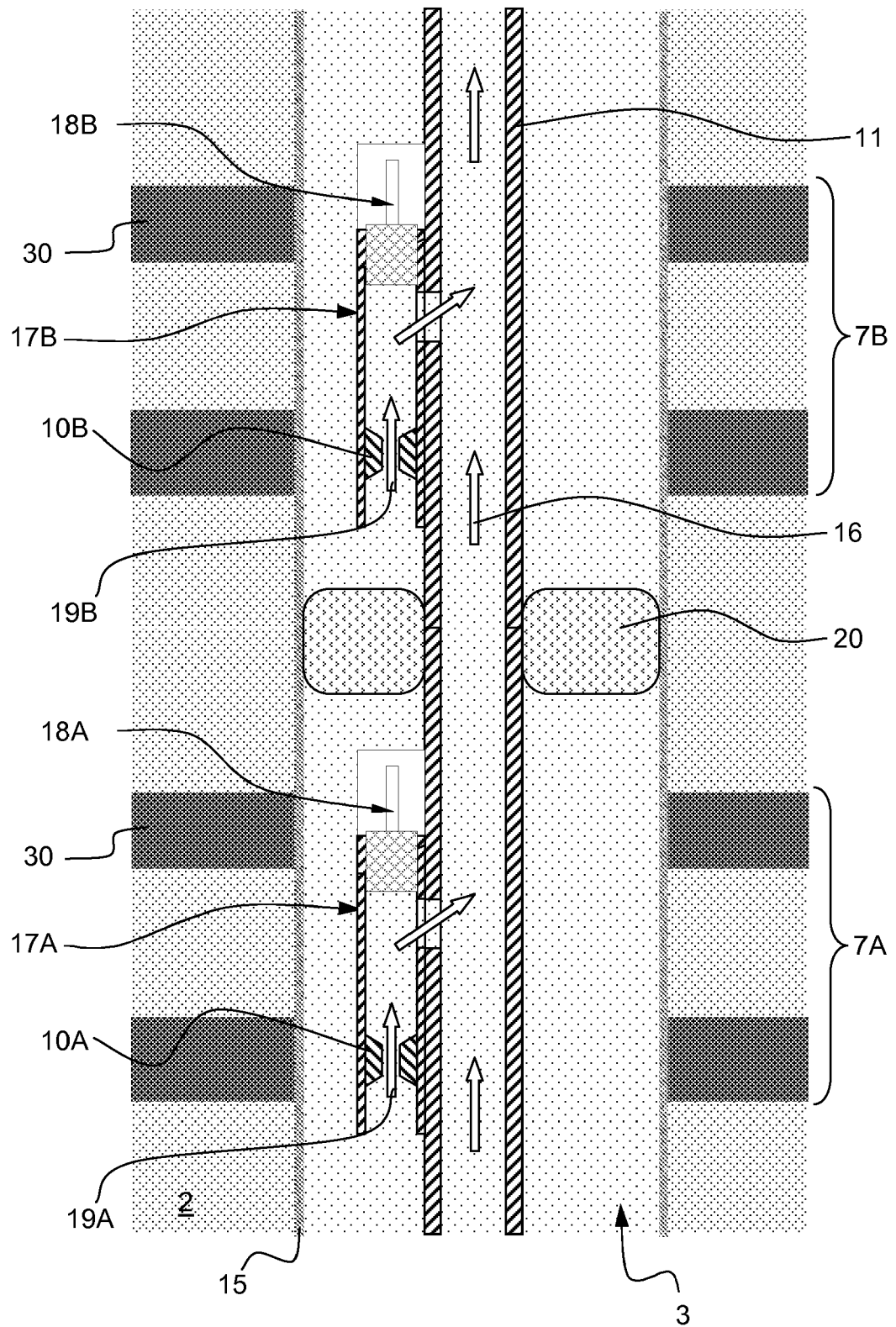
FIG. 7 is a front cross-section view in a geological formation schematically showing two instrumented tubings associated to two different producing zones in an uncased borehole.

FIG. 7 is a front cross-section view of a geological formation 2 schematically showing two instrumented tubings 17A, 17B comprising two Venturi flow meters 10A, 10B, two control valves 18A, 18B associated to two different producing zones 7A, 7B in an uncased borehole, respectively. The two producing zones 7A, 7B are separated from each other by an insulation packer 20. Though FIG. 7 depicts two instrumented tubings 17A, 17B comprising two Venturi flow meters 10A, 10B, one associated to a first production zone 7A and one associated to a second production zone 7B, further instrumented tubings comprising Venturi flow meter may be deployed in order to separate a plurality of producing zones. The other elements of the instrumented tubings and the flow meters are identical to the ones described in relation to the FIG. 2 embodiment and will not be further described.

It should be appreciated that embodiments of the disclosure are not limited to onshore hydrocarbon wells and can also be used offshore. Furthermore, although some embodiments have drawings showing a vertical well-bore, said embodiments may also apply to a horizontal or deviated well-bore. All the embodiments of the disclosure are equally applicable to cased and uncased borehole (open hole). Although particular applications of the disclosure relate to the oilfield industry, other applications to other industry, e.g. the water industry or the like also apply.

The drawings and their description hereinbefore illustrate rather than limit the disclosure.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. A method of determining a flow rate of a fluid flowing in a tubing using a flow meter, said flow meter measuring a value related to the flow rate, wherein the tubing includes a valve for controlling the fluid flowing through the flow meter, the method comprising:

closing the valve and measuring a first zero flow rate value at a first time and a second zero flow rate value at a second time;

estimating an error of the value measurement based on the first and second zero flow rate values;

opening the valve and measuring value of the flowing fluid; and applying an error correction to the measured value of the flowing fluid, and calculating a corrected flow rate based on the corrected value of flowing fluid.

2. The flow rate determination method according to claim 1, wherein the error correction is a combination of an offset correction and a drift correction.

3. The flow rate determination method according to claim 1, wherein the steps of closing the valve and estimating the error are performed periodically.

4. The flow rate determination method according to claim 1, wherein the measured value is an absolute pressure.

5. The flow rate determination method according to claim 1, wherein the flowmeter is a Venturi flow meter that includes a throat, an upstream pressure taping and a throat pressure tapping.

6. The flow rate determination method according to claim 5, wherein the error is estimated by determining the offset and drift based on a differential pressure between the upstream pressure taping and the throat pressure tapping at the first and second time of the valve closing.

7. The flow rate determination method according to claim 6, wherein the corrected flow rate is calculated based on a Venturi equation taking into consideration the estimated error.

8. The flow rate determination method according to claim 7, wherein the corrected estimation of flow rate is given by $$Q_C(t) = \frac{\pi d^2 C}{4} \frac{\sqrt{2|\Delta P_Q(t) - E(t)|}}{\sqrt{\rho(1-\beta^4)}},$$

where d is a diameter of the throat section, C is a discharge coefficient, $\Delta P_Q(t)$ is the differential pressure between upstream and throat pressure tappings, E(t) is the dynamic drift correction, ρ is the fluid density and β is a diameter ratio.

9. The flow rate determination method according to claim 1, wherein the valve closing is commanded by an electronic unit of the flow meter.

10. The flow rate determination method according to claim 9, wherein the valve closing is commanded by a surface equipment.

11. An instrumented tubing, comprising:
- a valve for controlling the fluid flowing through the flow meter;
- a flow meter for measuring a flow rate of a fluid flowing in the tubing, the measurement including a first zero flow rate value at a first time and a second zero flow rate value at a second time and for measuring a flowing value; and
- an electronic unit comprising a processor for estimating an error of the value measurement based on the first and second zero flow rate values, applying an error correction to the measured value of the flowing fluid, and calculating a corrected flow rate based on the corrected value of flowing fluid.

12. The instrumented tubing according to claim 11, wherein the flow meter is a Venturi flow meter comprising a throat, an upstream pressure taping and a throat pressure tapping.

* * * * *